United States Patent

[11] 3,624,214

[72] Inventor Graham T. Stevenson
 Midland, Mich.
[21] Appl. No. 22,698
[22] Filed Mar. 25, 1970
[45] Patented Nov. 30, 1971
[73] Assignee The Dow-Chemical Company
 Midland, Mich.

[54] GUANIDENE DERIVATIVES FOR COCCIDIOSIS
 11 Claims, No Drawings
[52] U.S. Cl. .................................................... 424/326
[51] Int. Cl. ................................................ A61k 27/00
[50] Field of Search ........................................ 424/326

[56] References Cited
 UNITED STATES PATENTS
3,499,927 3/1970 Badcock..................... 424/326

Primary Examiner—Sam Rosen
Attorneys—Griswold and Burdick, S. Preston Jones and C. Kenneth Bjork ABSTRACT: Animals are treated by oral administration of a 1,2,3-tris[(p-halobenzylidene)amino]guanidine or its hydrochloride salt to allow maximum normal growth of the animals by the control of protozoan organisms and mitigate against the attack of gastrointestinal parasites. The guanidine compound is of the formula:

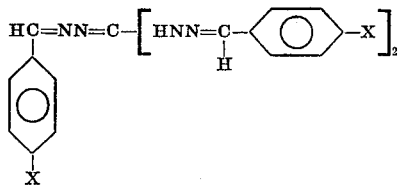

wherein X is chlorine or bromine.

GUANIDENE DERIVATIVES FOR COCCIDIOSIS

BACKGROUND OF THE INVENTION

This invention relates to animal husbandry and more particularly to methods and compositions adapted to be employed to allow maximum normal growth of animals, for controlling protozoan organisms and for mitigating against the attack of gastrointestinal parasites. The term "animal" as used herein is employed in context of its general definition and is meant to include fowl, particularly domesticated fowl; i.e. poultry.

It is an object of the present invention to provide a new and improved practice for raising and benefiting animals such as rabbits, lambs, calves, chickens, guinea fowl, pigeons, geese, turkeys and other domesticated animals and to provide a new and improved method and composition for mitigating against and protecting animals from the attack of gastrointestinal parasites. Still another object is to provide a method and composition which may be employed prophylactically to protect animals from the attack of gastrointestinal parasites without adversely affecting the normal physiological processes.

SUMMARY OF THE INVENTION

The present invention comprises a novel composition and method for orally administering to animals a 1,2,3-tris[(p-halobenzylidene)amino]guanidine compound or its hydrochloride salt. The guanidine compound is of the formula:

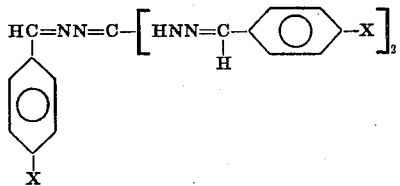

wherein X represents chlorine or bromine.

Representative guanidine compounds include 1,2,3-tris[(p-chlorobenzylidene)amino]guanidine; 1,2,3-tris[(p-chlorobenzylidene)amino]guanidine, hydrochloride; 1,2,3-tris[(p-bromobenzylidene)amino]guanidine, and 1,2,3-tris[(p-bromobenzylidene)amino]guanidine, hydrochloride.

The practice allows maximum normal growth of the animals and protects the animals from parasitic diseases of the gastrointestinal tract and particularly from coccidiosis. Further, the practice protects the animals from mixed coccidial infections and from the various strains of the same species of coccidial organism and particularly from the various strains of *Eimeria tenella*, *Eimeria necatrix*, *Eimeria acervulina*, *Eimeria maxima* and *Eimeria brunetti*. Also, while protecting the animals from coccidiosis, the practice allows the protected animals which are exposed to the coccidial infection to develop acquired immunity to the disease.

The guanidine-type compounds are crystalline solids and are adapted to be administered to animals. The compounds are not repellent to animals and can be employed in admixture with grain rations, animal feeds or drinking water. They can be administered continuously or intermittently in dosages sufficient to allow maximum normal growth and utilization of feed and to protect the animal from the attack of gastrointestinal parasites without adversely affecting the normal physiological processes, or without imparting any unpalatable characteristic to animal flesh.

The oral administration of an effective dosage of the compounds is essential and critical for the practice of the present invention. In general, good results are obtained when the animals are fed a daily dosage of from about three to about 1,000 parts of the compounds per million parts of dietary intake, and preferably from about 15 to about 250 parts per million parts of dietary intake. Where danger of reexposure to the attack of intestinal parasites from contaminated feed or surroundings is low, good results are obtained when the animals are fed a daily dosage of about 60 parts or more per million parts of dietary intake. By the term "dietary intake" is meant grain rations, animal feeds and/or drinking water.

The method of the present invention can be carried out by the oral administration of the unmodified compounds. However, the present invention also embraces the employment of a liquid, powder, mash, pellet, capsule or other animal food containing said compounds. In such usage, the compounds can be modified with one or more of a plurality of additaments including water, ethanol, skim milk, edible oils, propylene glycol, syrups, grain rations, surface active dispersing agents such as the liquid and solid emulsifying agents and solid carriers such as edible powders and commercial animal feeds, concentrates or supplements. By "commercial animal feeds, concentrates or supplements" are meant the partial and complete animal feeds containing desirable amounts of minerals, vitamins, antioxidants, antibiotics and growth stimulants. Further, the compositions are adapted to be fed to animals to supply the desired dosage of active agents, or to be employed as concentrates and subsequently diluted with additional carrier to produce the ultimate compositions.

The exact concentration of the compounds to be employed in the compositions can vary provided that enough of the composition is ingested by the animal so as to provide the required internal amount of active ingredient as set forth hereinbefore. For example, where direct administration to the individual animal is preferred, liquid or solid compositions containing from 5 to 98 percent by weight of the agents conveniently are employed to supply the desired dosage. Where the compounds are provided as a constituent of the principal food ration, satisfactory results are obtained with food rations containing a minor but effective amount of the compounds. The exact amounts of the compounds in the ration are dependent upon the food consumption and feeding habits of the animal concerned. With most animals, the required dosage can be supplied with mash compositions containing from 0.001 to 0.1 percent by weight of active material when fed as the principal food ration. The compounds can also be furnished in the drinking water by conventional formulation techniques.

In liquid compositions to be employed as concentrates, the active agents can be present in a concentration of from 5 to 98 percent by weight. Preferred concentrate compositions oftentimes contain two or more percent by weight of a liquid or solid surface active agent.

Liquid compositions containing the desired amount of the compounds can be prepared by dissolving the compounds in ethanol, propylene glycol or an oil or by dispersing them in water with or without the aid of a suitable surface active dispersing agent such as an ionic or nonionic surface active agent. Suitable surface active dispersing agents include the glycerol and sorbitan esters of fatty acids and the polyoxyalkylene derivatives of fatty alcohols and of sorbitan esters. The aqueous compositions can contain one or more water-immiscible oils as a solvent for the active agent.

In the preparation of solid feed compositions, the compounds can be mechanically ground with an innocuous solid such as cereal meal, oyster shell flour, or a solid surface active dispersing agent such as finely divided bentonite or fuller's earth. These compositions can be administered in the form of capsules or tablets or dispersed in an animal feed and such feed used to supply a part or all of the ration. Alternatively, the compounds can be dissolved in an organic solvent such as alcohol or acetone and the resulting mixture dispersed in an animal feed which is then dried to remove the solvent. The compounds can also be dispersed in an edible oil such as coconut, olive, cottonseed or peanut oil and the resulting mixtures dispersed in the feed. These edible oil compositions can contain one of the aforementioned emulsifying materials as a dispersing agent.

In addition to poultry feeds containing a minor amount of the guanidine compound as an effective anticoccidial agent, there are provided in accordance with an additional aspect of this invention poultry feed supplement compositions wherein the heretofore described compound is intimately dispersed in, or admixed with, a suitable nontoxic diluent or carrier. The carrier vehicle employed in these supplement compositions should be one in which the coccidiostat is stable, which is compatible with a finished poultry feed and which can be administered with safety to the animals. These feed supplements, which contain a significantly higher percentage of coccidiostat than does the finished feed, are mixed with or blended into the feedstuff. In order to assure uniform distribution of the coccidiostat in the finished feed, it is customary to employ an intermediate dilution step in which the supplement is blended with a portion of the final feed, and this "intermediate mix" is reflects the difference in the challenge necessary for each coccidial organism to give a 100 percent degree of pathogenicity. Another flock of birds is left untreated and uninoculated to serve as an uninfected check. Seven days following the initiation of the diets, the birds are sacrificed, autopsied and an examination made to determine the percent control of coccidiosis and of the coccidial organisms. The percent control of coccidiosis and the coccidial organisms obtained in the evaluations at the indicated percent by weight of guanidine compound in the diets as well as in the infected and uninfected checks is set forth below in table I.

TABLE I

| Agent employed in diet | Percent by weight of agent in feed | Percent control of coccidiosis and the coccidial organisms | | |
|---|---|---|---|---|
| | | Eimeria tenella | Eimeria necatrix | Eimeria acervulina |
| 1,2,3-tris[(p-chlorobenzylidene)amino]guanidine. | 0.05 | 100 | 100 | 91 |
| | 0.025 | 100 | 100 | 89 |
| | 0.0125 | 100 | 100 | 83 |
| | 0.0062 | | 92 | |
| 1,2,3-tris[(p-chlorobenzylidene)amino]guanidine, hydrochloride. | 0.05 | 97 | 100 | 85 |
| | 0.025 | 84 | 100 | 92 |
| | 0.0125 | 84 | 100 | 94 |
| | 0.0062 | | 100 | |
| 1,2,3-tris[(p-bromobenzylidene)amino]guanidine. | 0.05 | 84 | 100 | 91 |
| | 0.025 | 73 | 100 | 93 |
| | 0.0125 | 77 | 100 | 82 |
| | 0.0062 | | | |
| 1,2,3-tris[(p-bromobenzylidene)amino]guanidine, hydrochloride. | 0.05 | 100 | 100 | 86 |
| | 0.025 | 83 | 100 | 94 |
| | 0.0125 | 81 | 100 | |
| | 0.0062 | | | |
| Infected check (Control) | 0 | [1] | [1] | [1] |
| Uninfected check (Control) | 0 | [2] | [2] | [2] |

[1] All birds heavily infected with coccidial organisms.
[2] No coccidial organisms or disease.

then added to the remainder of the feed with adequate mixing. The coccidiostat compounds described hereinabove may be formulated into feed supplement compositions containing from about 0.25 percent to about 30 percent by weight of the active ingredient. It will, therefore, be appreciated that the preferred supplement concentration will depend to a large extent on the final use level desired. With the compounds of this invention, feed supplement compositions containing from about 1-20 percent by weight of active ingredient are quite suitable.

The diluents normally employed for these poultry feed supplements are solid orally ingestible poultry feed additives such as distillers' dried grains, corn meal, citrus meal, fermentation residues, ground oyster shells, Attapulgus clay, wheat middling, wheat shorts, molasses solubles, corn cob meal, corn gluten feed, corn germ meal, edible vegetable substances, soybean meal, dehulled soya flour, soybean mill feed, antibiotic mycelia, crushed limestone, soya grits and the like. This dilution serves to facilitate uniform distribution of the substance in the finished feed. The finished feed is one that contains a source of fat, protein, carbohydrate, minerals, vitamins and other nutritional factors.

The following examples will serve to further illustrate the present invention but are not meant to limit it thereto.

EXAMPLE 1

1,2,3-tris[(p-chlorobenzylidene)amino]guanidine; 1,2,3-tris[(p-chlorobenzylidene)amino]guanidine, hydrochloride; 1,2,3-tris[(p-bromobenzylidene)amino]guanidine and 1,2,3-tris[(p-bromobenzylidene)amino]guanidine, hydrochloride are separately dispersed in commercial poultry mash to produce animal feed compositions containing predetermined amounts of one of the guanidine compounds. Portions of these compositions and unmodified mash are fed as a sole feed ration to flocks of chickens of the same history and past environment which are about 17 days old. One day after the diets are begun, 50,000 sporulated *Eimeria necatrix* oocysts or 200,000 sporulated *Eimeria tenella* oocysts or 5,000,000 sporulated *Eimeria acervulina* oocysts are introduced directly into the crop of the birds. The difference in the inoculation rate

EXAMPLE 2

Portions of the feed compositions as described in example 1 and unmodified poultry feed were fed as a sole ration to groups of chickens of the same history and past environment. Each test group consists of 30 birds which are about 16 days old. The birds are maintained on wire in battery brooders according to conventional sanitary poultry practices. One day following the initiation of the diets, 200,000 sporulated oocysts of a mixed culture of *Eimeria tenella* oocysts and *Eimeria necatrix* oocysts are introduced directly into the crop of each bird. Another 30-bird flock was left untreated and uninoculated to serve as an uninfected check.

During the interval between the fourth and eleventh days following the initiation of the diets, the birds are observed for bloody diarrhea and gastrointestinal hemorrhage attributable to coccidial disease and the attack of the coccidial organisms. Hemorrhage scores are made with 0 for no hemorrhage, 1 for slight hemorrhage, 2 for moderate hemorrhage, 3 for severe hemorrhage and 4 for very severe hemorrhage.

Following the inoculation, the birds are observed for mortality, and any birds which die are autopsied to ascertain whether or not their death was attributable to coccidial disease and the attack of the coccidial organisms. The hemorrhage scores for the treated birds are also compared with the hemorrhage scores for the infected checks and the percent control of hemorrhage determined. The results obtained in these operations are set forth in table II.

TABLE II

| Agent Employed in Diet | % by weight of agent in feed in feed | Hemorrhage Scores |
|---|---|---|
| 1,2,3-tris[(p-chlorobenzylidene)amino]guanidine | 0.05 | 0 |
| | 0.025 | 0 |
| | 0 | |
| 1,2,3-tris[(p-chlorobenzylidene)amino]guanidine, hydrochloride | 0.05 | 0 |

| | | |
|---|---|---|
| 1,2,3-tris[(p-bromobenzyl-idene)amino]guanidine | 0.025 | 0 |
| | 0.0125 | 0 |
| | 0.05 | 0 |
| | 0.025 | 0 |
| | 0.0125 | 1 |
| 1,2,3-tris[(p-bromobenzyl-idene)amino]guanidine, hydrochloride | 0.05 | 0 |
| | 0.025 | 0 |
| | 0.0125 | (a) |
| Infected check | none (control) | 4 |
| Uninfected check | none (control) | 0 | a. one chicken had slight hemorrahage

EXAMPLE 3

In a similar operation, each of the compounds 1,2,3-tris[(p-chlorobenzylidene)amino]guanidine; 1,2,3-tris[(p-chlorobenzylidene)amino]guanidine, hydrochloride; 1,2,3-tris[(p-bromobenzylidene)amino]guanidine and 1,2,3-tris[(p-bromobenzylidene)amino]guanidine, hydrochloride were fed as constituents of animal feed to 30-bird groups of chickens and the chickens subsequently inoculated with a mixed culture of various species of coccidia. In such operations, the inoculum employed per bird contained sporulated coccidial oocysts in number and type as follows: 200,000 Eimeria tenella, 50,000 Eimeria necatrix, and 5,000,000 Eimeria acervulina. The results obtained in these operations are set forth in table III.

| | 0.025 | 100 |
|---|---|---|
| | 0.0125 | 100 |
| Infected check | 0 (Control) | (1) |
| Uninfected check | 0 (Control) | (2) |

1. All birds showed very severe hemorrhage
2. No hemorrhage

EXAMPLE 4

Twenty-five percent by weight of each of 1,2,3-tris[(p-chlorobenzylidene)amino]guanidine; 1,2,3-tris[(p-chlorobenzylidene)amino]guanidine, hydrochloride; 1,2,3-tris[(p-bromobenzylidene)amino]guanidine and 1,2,3-tris[(p-bromobenzylidene)amino]guanidine, hydrochloride are separately ground with 75 parts of fuller's earth to prepare dispersible concentrates. Portions of the latter compositions are dispersed in commercial poultry starting mash to produce medicated feed compositions containing 0.05 percent by weight of one of the agents.

The medicated feed compositions and unmodified starting mash are fed as a sole feed ration to groups of chickens of the same history and past environment. Each such test group consisted of three birds which are 2 weeks of age. Forty-eight hours after the initiation of the diets, 80,000 sporulated Eimeria tenella oocysts are introduced directly into the crop of each bird. After the end of the fifth and seventh day following the inoculation, the birds are weighed and the average weight

TABLE IV

| | Average weight per test group in grams at the indicated intervals following inoculation | | | Percent weight increase of test group | Percent control of coccidiosis and coccidial organisms |
|---|---|---|---|---|---|
| Active agent at dosage of 0.05 weight percent of feed | 0 day | 5 days | 7 days | | |
| 1,2,3-tris[(p-chlorobenzylidene)amino]guanidine | 426 | 667 | 762 | 80 | 100 |
| 1,2,3-tris[(p-chlorobenzylidene)amino]guanidine, hydrochloride | 424 | 659 | 740 | 75 | 97 |
| 1,2,3-tris[(p-bromobenzylidene)amino]guanidine | 395 | 601 | 687 | 74 | 84 |
| 1,2,3-tris[(p-bromobenzylidene)amino]guanidine, hydrochloride | 406 | 642 | 729 | 80 | 100 |
| Uninfected checks (Control) | 412 | 625 | 697 | 69 | (1) |
| Infected checks (Control) | 420 | 570 | 592 | 41 | (2) |

1 No coccidial organisms or disease.
2 All birds heavily infected with coccidial organisms.

TABLE III

| Agent Employed in Diet | % by weight of agent in feed | % control of hemorrhage |
|---|---|---|
| 1,2,3-tris[(p-chlorobenzyl-idene)amino]guanidine | 0.05 | 100 |
| | 0.025 | 100 |
| | 0.0125 | 100 |
| 1,2,3-tris[(p-chlorobenzyl-idene)amino]guanidine, hydrochloride | 0.05 | 100 |
| | 0.025 | 100 |
| | 0.0125 | 100 |
| 1,2,3-tris[(p-bromobenzyl-idene)amino]guanidine | 0.05 | 100 |
| | 0.025 | 100 |
| | 0.0125 | 100 |
| 1,2,3-tris[(p-bromobenzyl-idene)amino]guanidine, hydrochloride | 0.05 | 100 | for each test group, determined. Another group of birds was left untreated and uninoculated to serve as an uninfected check. The average weights of each test group at the aforementioned intervals, the percent weight increase and percent control of coccidiosis for each test group are set forth in table IV.

EXAMPLE 5

In a similar operation, portions of the concentrates of example 4 are dispersed in commercial poultry starting mash to produce medicated feed compositions containing 0.025 percent by weight of one of the agents.

These medicated feed compositions and unmodified starting mash are fed as a sole feed ration to groups of chickens of the same history and past environment. Each such test group consisted of three birds which are 2 weeks of age. Forty-eight hours after the initiation of the diets, 5,000,000 sporulated Eimeria acervulina oocysts are introduced directly into the crop of each bird. After the end of the fifth and seventh day

TABLE V

| | Average weight per test group in grams at the indicated intervals following inoculation | | | Percent weight increase of test group | Percent control of coccidiosis and coccidial organisms |
|---|---|---|---|---|---|
| Active agent at dosage of 0.025 weight percent of feed | 0 day | 5 days | 7 days | | |
| 1,2,3-tris[(p-chlorobenzylidene)amino]guanidine | 370 | 540 | 637 | 72 | 89 |
| 1,2,3-tris[(p-chlorobenzylidene)amino]guanidine, hydrochloride | 410 | 608 | 730 | 78 | 92 |
| 1,2,3-tris[(p-bromobenzylidene)amino]guanidine | 406 | 588 | 725 | 79 | 93 |
| 1,2,3-tris[(p-bromobenzylidene)amino]guanidine, hydrochloride | 411 | 613 | 738 | 80 | 94 |
| Uninfected checks (Control) | 411 | 582 | 720 | 75 | (1) |
| Infected checks (Control) | 425 | 560 | 530 | 25 | (2) |

1 No coccidial organisms or disease.
2 All birds heavily infected with coccidial organisms.

following the inoculation, the birds are weighed and the average weight for each test group, determined. Another group of birds was left untreated and uninoculated to serve as an uninfected check. The average weights of each test group at the aforementioned intervals and the percent weight increase for each test group are set forth in table V.

EXAMPLE 6

Ninety parts by weight of 1,2,3-tris[(p-chlorobenzylidene)amino]guanidine; 1,2,3-tris[(p-chlorobenzylidene)amino]guanidine, hydrochloride; 1,2,3-tris[(p-bromobenzylidene)amino]guanidine and 1,2,3-tris[(p-bromobenzylidene)amino]guanidine, hydrochloride are separately mechanically ground with bentonite to produce concentrate compositions containing 90 percent by weight of one of the guanidine compounds.

In a similar manner, additional feed supplements are prepared by grinding together 50 parts by weight of one of the guanidines identified hereinabove with 1 part of sorbitan menopalmitate (Span 20) and 49 parts of attapulgite clay to produce compositions containing 50 percent by weight of one of the guanidine compounds.

In another operation, the guanidine compounds as identified in the foregoing two paragraphs are separately dispersed in 90 parts of cottonseed oil to prepare edible oil compositions containing one of the guanidine compounds.

These compositions are adapted to be administered to animals to supply the desired dosage of active compound or to be employed as concentrates and subsequently diluted with additional edible additaments, grain rations or animal feeds to produce animal feed compositions containing the desired amount of active agent.

EXAMPLE 7

In another operation, 20 parts by weight of one of 1,2,3-tris[(p-chlorobenzylidene)amino]guanidine; 1,2,3-tris[(p-chlorobenzylidene)amino]guanidine, hydrochloride; 1,2,3-tris[(p-bromobenzylidene)amino]guanidine and 1,2,3-tris[(p-bromobenzylidene)amino]guanidine, hydrochloride are separately mechanically mixed with 80 parts of soybean meal to produce animal feed compositions containing 20 percent of one of the guanidine compounds. When these compositions are dispersed in commercial animal feed to produce animal feed compositions containing 0.01 percent by weight of one of the guanidine compounds and fed to chickens, results of weight gains and control of coccidial organisms substantially as described hereinbefore are obtained.

In a further embodiment, the guanidine-type compounds as employed in accordance with the present invention, or compositions containing the same, advantageously can be employed in the present methods in combination with one or more other feed additives including agents active against gastrointestinal parasites, as supplemental materials. Representative additives and agents include 2-sulfanilamidoquinoxaline, acetyl(p-nitrophenyl) sulfanilamide, sulfadimethylpyridine, 2,2'-methylene bis(4-chlorophenol), 4,4'-isopropylidene bis(o-cresol), 5-nitro-2-furaldehyde semicarbazone, furoxone N-(5-nitro-2-furfurylidene-3-amino-2-oxazolidone), 3-nitro-4-hydroxyphenyl arsonic acid, p-aminobenzene arsonic acid, (1-(4-amino-2-n-propyl-5-pyrimidinylmethyl)-2-pycolinum chloride hydrochloride), the complex of 4,4'-dinitrocarbanilide and 2-hydroxy-4,6-dimethylpyrimidine, 4,5imidazole dicarboxamide, methyl-4-acetamido-2-ethoxybenzoate, oxytetracycline, chlorotetracycline, N-(4'-chlorophenyl)-7-oxabicyclo(2.2.1)-heptane-2,3-dicarboxamide, methyl-4-acetamido-2-ethoxybenzoate, tetraethyl thiuram disulfide, arsenosobenzene, 5-nitro-2-furaldehyde acetohydrazone, 2,2'-dihydroxy-3,3',5,5'-tetrachlorodiphenylsulfide, 4,6-diamino-2,2-dimethyl-1,3,5-triazine hydrochloride, sulfamethazine, sulfamerazine, sulfadimidine, 2,4-diamino-5-(p-chlorophenyl)-6-ethylpyrimidines, 2,4-diamino-5-(3,4-dichlorophenyl)-6,6-diethyl-5,6-dihydro-1,3,5-triazines, 3,5-dinitrobenzamide, 3,5-dinitro-o-toluamide, 2-chloro-4-nitrobenzamide and other analogues 2,4-diamino-5-aryl-6-alkylpyrimidines, 2,4-diamino-5-aryl-6,6-dialkyl-5,6-dihydro-1,3,5-triazines, dinitrobenzamides, dinitrotoluamides and 3,5-dichloro-2,6-dimethylpyridinol.

In representative operations, each of the feed additives identified in the preceding paragraph together with one of the guanidine compounds as shown in example 6 are mechanically mixed and ground with commercial poultry mash to produce animal feed compositions. In such operations, the materials are employed in amounts sufficient to provide feed compositions containing from about 0.0045 to about 0.0125 percent by weight of one of the feed additives identified in the preceding paragraph and from about 0.006 to about 0.0125 percent by weight of one of the guanidine compounds shown in example 6. These compositions are of excellent value in animal husbandry and are adapted to be fed to poultry to obtain maximum normal growth and to mitigate against the attack of protozoan organisms and particularly *Eimeria* organisms. The guanidine compounds employed in the practice of the present invention can be prepared as follows:

1, 2, 3-tris [(p-chlorobenzylidene)amino]guanidine, hydrochloride

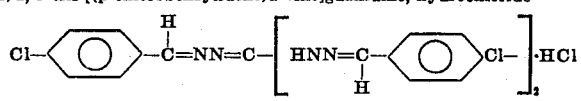

To a flask containing 2,000 milliliters of a 1:1 water-ethanol mixture having dissolved therein 112.0 grams (0.8 mole) of triaminoguanidine hydrochloride is added, under agitation, 20 milliliters of concentrated hydrochloric acid. Thereafter, 336.0 grams (2.4 moles) of p-chlorobenzaldehyde dissolved in 3,000 milliliters of ethanol is added thereto over a 30-minute period. This mixture is thereafter maintained under agitation at ambient temperature for about 20.0 hours. The reaction mixture is filtered and the crystals obtained are stirred in 2,500 milliliters of ethanol and the insolubles obtained by filtration. One-third of the filter cake obtained is stirred in 1,200 milliliters of diethylether and the solids removed by filtration. The 1,2,3-tris[(p-chlorobenzylidene)amino]guanidine, hydrochloride product is recovered in a yield of 124.0 grams after air drying. The identity of the product is confirmed by infrared spectroscopy (I.R.) and nuclear magnetic resonance spectra (NMR) analysis.

1, 2, 3-tris [(p-chlorobenzylidene)amino]guanidine

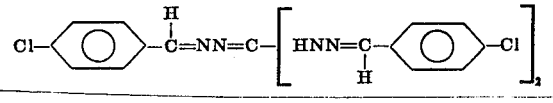

The remaining two-thirds filter cake from the ethanol wash in the previous synthesis is stirred in a mixture of 200 milliliters of concentrated ammonium hydroxide and 2.0 liters of water for about 20 hours. The mixture is filtered and the crystals so obtained are washed successively with 2.0 liters of water, 2.0 liters of ethanol and 1,300 milliliters of diethylether. The 1,2,3-tris[(p-chlorobenzylidene)amino] guanidine product is recovered in a yield of 202 grams after air drying. The identity of the product is confirmed by I.R. and NMR analysis.

This procedure is disclosed in Jour. Amer. Chem. Soc. 74, 5802 (1952).

The p-bromo analogs are prepared in a similar procedure employing p-bromobenzaldehyde as the aldehyde reactant.

What is claimed is:

1. In the practice of animal husbandry for protection against coccidiosis, the method which comprises orally administering to animals a 1,2,3-tris[(p-halobenzylidene)amino]guanidine compound or its hydrochloride salt, the guanidine compound being of the formula

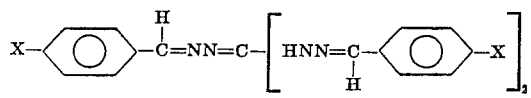

wherein X is chlorine or bromine, said compound being employed in an amount of from about three to about 1,000 parts per million of dietary intake.

2. The method as defined in claim 1 wherein said guanidine compound or its hydrochloride salt is in intimate admixture with an innocuous carrier.

3. The method of claim 2 wherein the guanidine compound is 1,2,3-[(p-chlorobenzylidene)amino]guanidine.

4. The method of claim 2 wherein the active ingredient is 1,2,3-[(p-chlorobenzylidene)amino](p-shlorobenzylidene)amino]guanidine, hydrochloride.

5. The method of claim 2 wherein the active ingredient is 1,2,3-[(p-bromobenzylidene)amino]guanidine.

6. The method of claim 2 wherein the active ingredient is 1,2,3-[(p-bromobenzylidene)amino]guanidine, hydrochloride.

7. The method of claim 1 wherein the guanidine compound or its salt is administered in an amount of from about 15 to about 250 parts per million parts of dietary intake.

8. The method of claim 2 wherein the active ingredient is administered in an amount of from about 15 to about 250 parts per million parts of dietary intake.

9. A composition comprising from about 5 to 98 percent by weight of a 1,2,3-tris[(p-halobenzylidene)amino]guanidine compound or its hydrochloride salt, the guanidine compound being of the formula

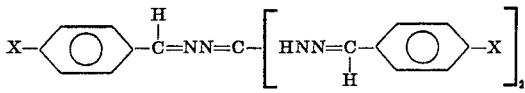

wherein X is chlorine or bromine as active agent in intimate admixture with a surface active agent and an innocuous carrier.

10. A composition containing an animal feed and from about 0.001 to about 0.1 percent by weight of a 1,2,3-tris[(p-halobenzylidene)amino]guanidine compound or its hydrochloride salt, the guanidine compound being of the formula

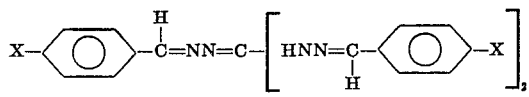

wherein X is chlorine or bromine.

11. The animal feed as defined in claim 10 and containing from 0.001 to 0.1 percent by weight of said 1,2,3-tris[(p-halobenzylidene)amino]guanidine compound or its hydrochloride salt.

* * * * *

UNITED STATES PATENT OFFICE
CERTIFICATE OF CORRECTION

Patent No. 3,624,214          Dated 30 November 1971

Inventor(s) Graham T. Stevenson

It is certified that error appears in the above-identified patent and that said Letters Patent are hereby corrected as shown below:

In column 4, Table II at line 65, delete "0" and insert --0.0125-- in the third line of the second column; insert --0-- in the third line of the third column.

In column 9, line 18, delete "(p-shlorobenzy-"; and in line 19 delete "lidene)amino]".

Signed and sealed this 11th day of July 1972.

(SEAL)
Attest:

EDWARD M. FLETCHER, JR.　　　　ROBERT GOTTSCHALK
Attesting Officer　　　　　　　　Commissioner of Patents